W. A. GREENLAW.
LOCKING DEVICE FOR TRAIN PIPE COUPLINGS.
APPLICATION FILED AUG. 23, 1911.
1,053,910.
Patented Feb. 18, 1913.
2 SHEETS—SHEET 1.
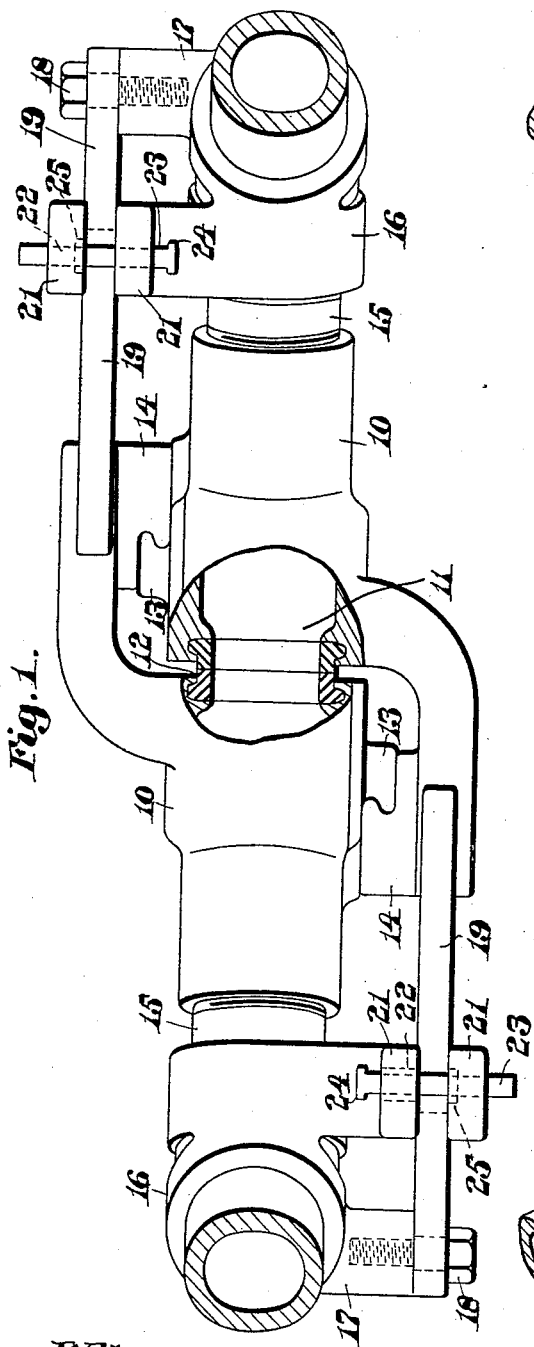
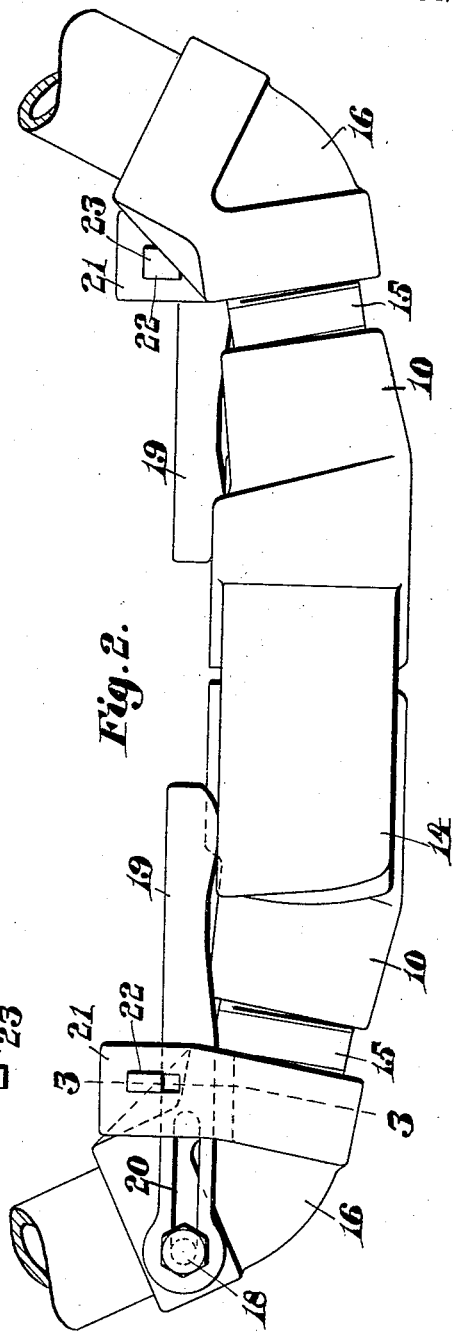
Witnesses:
Inventor:
Warren A. Greenlaw,
by Walter E. Lombard,
Atty.

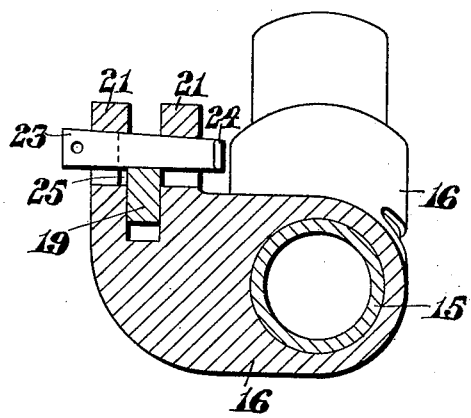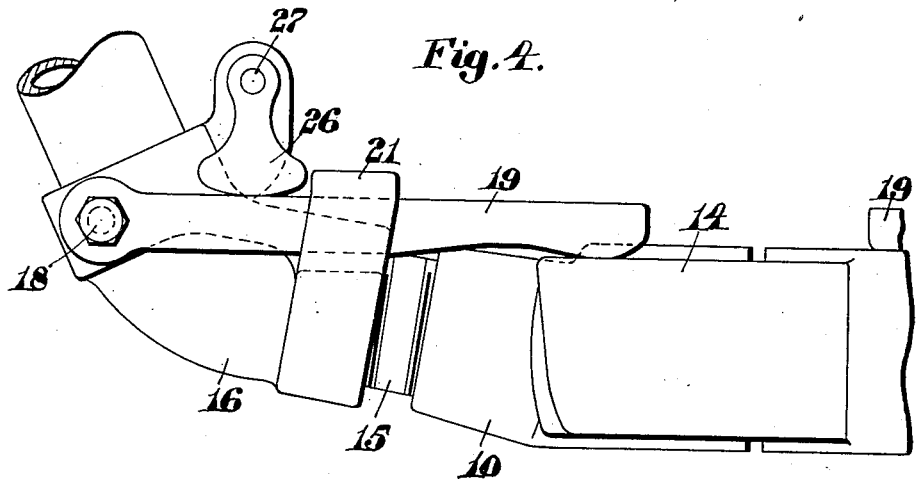

UNITED STATES PATENT OFFICE.

WARREN A. GREENLAW, OF MELROSE, MASSACHUSETTS, ASSIGNOR TO THE GREENLAW MANUFACTURING CO., OF BOSTON, MASSACHUSETTS, A CORPORATION OF MAINE.

LOCKING DEVICE FOR TRAIN-PIPE COUPLINGS.

1,053,910.      Specification of Letters Patent.     Patented Feb. 18, 1913.

Application filed August 23, 1911. Serial No. 645,636.

*To all whom it may concern:*

Be it known that I, WARREN A. GREENLAW, a citizen of the United States of America, and a resident of Melrose, in the county of Middlesex and State of Massachusetts, have invented certain new and useful Improvements in Locking Devices for Train-Pipe Couplings, of which the following is a specification.

This invention relates to locking devices for train pipe couplings, the particular object of the invention being to provide an effective device to coact with the usual coupling members used to connect the train pipes of two adjacent cars to prevent them from accidentally lifting and thereby leaking.

The invention consists of a bar pivotally secured to an elbow secured to one coupling member and held in contact with the upper face of the other coupling member by a suitable stop member.

The invention further consists in certain novel features of construction and arrangement of parts which will be readily understood by reference to the description of the drawings and to the claims to be hereinafter given.

Of the drawings: Figure 1 represents a plan of a pair of coupling members of usual construction with a locking device applied thereto embodying the features of the present invention. Fig. 2 represents an elevation of the same. Fig. 3 represents a transverse section of the same, the cutting plane being on line 3, 3 on Fig. 2, and Fig. 4 represents a modification of said locking device.

Similar characters designate like parts throughout the drawings.

In the drawings, 10, 10 are coupling members of usual construction provided with ports 11 having therein gaskets 12 adapted to be retained normally in alinement by means of locking flanges 13 and 14 extending from each coupling member 10. These locking flanges 13 and 14 prevent the separation of the coupling members 10, 10 but it oftens happens that under undue strain the coupling members 10, 10 will be lifted so that the locking flanges 13, 14 will become disconnected permitting the said members to accidentally separate or the gaskets 12 to be brought out of alinement thus causing a leak. This obviously is very objectionable and it is evident that some provision should be made to overcome these objections. To this end each coupling member is provided with a short nipple 15 to the outer end of which is secured a pipe elbow 16 having a boss 17 thereon to which is secured a pivot member 18. Pivotally mounted upon said pivot member 18 is a bar 19 provided with a longitudinal slot 20 therein through which said pivot member 18 extends. This bar 18 is positioned between two ears 21 preferably formed upon the elbow 16, these ears preventing any lateral play of said bar 19. The opposite end of said bar rests upon the upper face of the other coupling member 10 as indicated in the drawings.

Preferably the ears 21 are provided with slots 22 therein in which is positioned a key 23 extending from one ear to the other above the bar 19 thereby preventing its upward movement. It is obvious that when the bar 19 is thus positioned on the other coupling member 10 and locked from movement about its pivot 18 it would be impossible for the coupling members 10 to lift sufficiently to become disconnected or to cause a leak.

To prevent the key 23 from becoming misplaced a bur or projection 24 is formed upon its inner end which enters the recess 25 in the outer ear 21 when the key 23 is driven outwardly to permit the movement of the bar 19 about the pivot member 18 when it is desired to uncouple the members 10, 10.

When uncoupled the bar 19 moves longitudinally until the opposite end of the slot 20 contacts with the pivot member 18 in which position it will be out of the way when it is desired to again couple the members 10, 10.

While the embodiment shown in Figs. 1 to 3 inclusive is a preferred construction, it is obvious that other forms of locking members may be used beside the key 23, without departing from the invention. For instance a cam member 26 pivoted at 27 may be used as indicated in Fig. 4. This member 26 may be moved about its pivot 27 to permit the raising of the bar 19 and will absolutely prevent such movement when in the position shown in the drawings.

It is obvious that the location of all of the members of the locking device on the elbow 11 is of great advantage as by so doing the locking device may be readily applied to any form of coupling members 10, 10.

It is self evident that when a coupler provided with one of these locking devices is coupled with a coupling member attached to the ordinary rubber hose and unprovided with any locking member, even then the single locking device will effectually prevent any accidental uncoupling.

The operation and many advantages of a device such as is herein shown, it is believed, will be thoroughly understood without any further description.

Having thus described my invention, I claim:

1. In a device of the class described, the combination of two like coupling members provided with ports adapted to register and having interlocking flanges; a horizontal pivot member extending transversely of one of said coupling members; a bar mounted on said pivot member and normally resting on the locking flange of the other coupling member; and a key carried by the member to which said bar is pivoted engaging the outer face of said bar between its pivot and end thereby preventing its movement about its pivot.

2. In a device of the class described, the combination of two like coupling members provided with ports adapted to register and having interlocking flanges; a horizontal pivot member extending transversely of one of said coupling members; a bar mounted on said pivot member and normally resting on the locking flange of the other coupling member; a key carried by the member to which said bar is pivoted engaging the outer face of said bar between its pivot and end thereby preventing its movement about its pivot; and means for preventing the accidental displacement of said key.

3. In a device of the class described, the combination of two like coupling members provided with ports adapted to register and having interlocking flanges; a bar pivotally secured to one member and normally resting on the locking flange of the other; a slotted ear projecting from said member on either side of said bar; and a key in said slot adapted to prevent the movement of said bar about its pivot.

4. In a device of the class described, the combination of two like coupling members provided with ports adapted to register and having interlocking flanges; a bar pivotally secured to one member and normally resting on the locking flange of the other; a slotted ear projecting from said member on either side of said bar; a key in said slot resting upon the outer face of said bar between its pivot and end thereby preventing the movement of said bar about its pivot; and a shoulder on said key adapted to engage with one of said ears to prevent its accidental displacement.

5. In a device of the class described, the combination of two like coupling members provided with ports adapted to register and having interlocking flanges; a pipe elbow secured to one of said members and provided with a pivot member; a bar mounted on said pivot and normally resting on the other coupling member; and means carried by said elbow preventing the movement of said bar from its normal position and thereby positively locking the coupling members together.

6. In a device of the class described, the combination of two coupling members provided with ports adapted to register and having interlocking flanges; a pipe elbow secured to one of said members and provided with a pivot member; a bar mounted on said pivot and normally resting on the other coupling member having an elongated slot therein through which said pivot member extends; and means carried by said elbow preventing the movement of said bar from its normal position.

7. In a device of the class described, the combination of two coupling members provided with ports adapted to register and having interlocking flanges; a pipe elbow secured to one of said members and provided with a pivot member and an ear; a bar mounted on said pivot and normally resting on the other coupling member; and means carried by said ear preventing the movement of said bar from its normal position.

8. In a device of the class described, the combination of two coupling members provided with ports adapted to register and having interlocking flanges; a pipe elbow secured to one of said members and provided with a pivot member and two slotted ears; a bar mounted on said pivot and normally resting on the other coupling member; and means interposed between said ears preventing the movement of said bar from its normal position.

9. In a device of the class described, the combination of two coupling members provided with ports adapted to register and having interlocking flanges; a pipe elbow secured to one of said members and provided with a pivot member and two slotted ears; a bar mounted on said pivot and normally resting on the other coupling member; and a key in said slotted ears preventing the movement of said bar from its normal position.

10. In a device of the class described, the combination of two like coupling members provided with ports adapted to register and having interlocking flanges; a member pivotally secured to one of said coupling members and adapted to rest upon the other coupling member; an ear on the bar carrying member projecting upwardly beyond the upper face of said bar, and means carried by said ear adapted to engage the upper face of said bar to prevent the movement of the latter about its pivot from its normal position.

11. In a device of the class described, the combination of two like coupling members provided with ports adapted to register and having interlocking flanges; a member pivotally secured to one of said coupling members and adapted to rest upon the other coupling member; an ear on the bar carrying member projecting upwardly beyond the upper face of said bar; and a slidable member carried by said ear adapted to be moved into engagement with the upper face of said bar to prevent the movement of the latter about its pivot from its normal position, and to be moved out of the path of said bar to permit the separation of said coupling members.

Signed by me at No. 4 Post Office Sq., Boston, Mass. this 19th day of August, 1911.

WARREN A. GREENLAW.

Witnesses:
WALTER E. LOMBARD,
NATHAN C. LOMBARD.

---

Copies of this patent may be obtained for five cents each, by addressing the "Commissioner of Patents, Washington, D. C."